(12) United States Patent
L'Ecuyer (10) Patent No.: US 11,284,744 B2
(45) Date of Patent: *Mar. 29, 2022

(54) GRILL WITH STOVE ATTACHMENT DEVICE

(71) Applicant: Gerald V. L'Ecuyer, Anaheim, CA (US)

(72) Inventor: Gerald V. L'Ecuyer, Anaheim, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/589,709

(22) Filed: Oct. 1, 2019

(65) Prior Publication Data
US 2020/0029734 A1    Jan. 30, 2020

Related U.S. Application Data

(63) Continuation of application No. 15/624,500, filed on Jun. 15, 2017, now Pat. No. 10,426,294, which is a continuation-in-part of application No. 14/887,060, filed on Oct. 19, 2015, now Pat. No. 9,993,112.

(51) Int. Cl.
*A47J 37/07* (2006.01)

(52) U.S. Cl.
CPC ....... *A47J 37/0713* (2013.01); *A47J 37/0763* (2013.01)

(58) Field of Classification Search
CPC ..... A47J 37/0713; A47J 37/0763; F24C 1/16; F24C 3/14
See application file for complete search history.

(56) References Cited

U.S. PATENT DOCUMENTS

| | | | | |
|---|---|---|---|---|
| 192,011 | A * | 6/1877 | Richardson | A47J 37/0763 126/30 |
| 4,364,372 | A * | 12/1982 | Johnson | F24C 1/16 126/39 R |
| 4,553,524 | A * | 11/1985 | Wheat | A47J 37/0713 126/15 R |
| 4,809,671 | A * | 3/1989 | Vallejo, Jr. | F24C 3/14 126/25 R |
| 4,889,103 | A * | 12/1989 | Fraioli | F23D 14/125 126/92 AC |
| 5,038,749 | A * | 8/1991 | Jerry | F24C 3/14 126/40 |
| 5,065,735 | A * | 11/1991 | Bourgeois | F24C 15/10 126/40 |
| 5,158,067 | A * | 10/1992 | Dutro | A47J 37/0713 126/39 R |
| 5,179,932 | A * | 1/1993 | DeCarlo | A47J 37/0763 126/9 R |
| D386,936 | S * | 12/1997 | Stone | D7/332 |
| 5,992,407 | A * | 11/1999 | Tsai | F24C 3/14 126/38 |

(Continued)

*Primary Examiner* — Alfred Basichas
(74) *Attorney, Agent, or Firm* — John R. Ross; John R. Ross, III (57) ABSTRACT

A cooking device. A connection mechanism is rigidly attached to the underside of a grill. A plurality of legs is attached to the grill for support. A stove having cookware support extensions is attached to the grill and supported by the connection mechanism. The connection mechanism positions the cookware support extensions tightly against the underside of the grill for optimum heat transfer. In a preferred embodiment, the cooking device is small, lightweight and easily portable.

10 Claims, 9 Drawing Sheets

(56) References Cited

U.S. PATENT DOCUMENTS

| | | | | |
|---|---|---|---|---|
| 6,050,257 | A * | 4/2000 | Bond | A47J 37/0763 |
| | | | | 126/25 R |
| 6,978,777 | B2 * | 12/2005 | Pestrue | F24C 3/14 |
| | | | | 126/25 AA |
| 8,312,807 | B2 * | 11/2012 | Martinez | A47J 36/34 |
| | | | | 99/339 |
| 9,993,112 | B2 * | 6/2018 | L'Ecuyer, V | F24C 1/16 |
| D825,975 | S * | 8/2018 | Jaggard | D7/334 |
| 10,426,294 | B2 * | 10/2019 | L'Ecuyer, V | A47J 37/0713 |
| 2006/0213497 | A1 * | 9/2006 | Orozco | A47J 37/0786 |
| | | | | 126/41 R |
| 2010/0154770 | A1 * | 6/2010 | Zhou | F24C 15/28 |
| | | | | 126/42 |
| 2017/0105575 | A1 * | 4/2017 | L'Ecuyer | F24C 1/16 |
| 2017/0280933 | A1 * | 10/2017 | L'Ecuyer | A47J 37/0763 |

\* cited by examiner

GRILL WITH STOVE ATTACHMENT DEVICE

The present invention relates to cooking devices, and in particular, to cooking devices utilizing attachable portable stoves. The present invention is a Continuation of U.S. patent application Ser. No. 15/624,500, filed Jun. 15, 2017 (soon to issued Issue as U.S. patent Ser. No. 10/426,294 on Oct. 1, 2019), which is a Continuation-in-Part (CIP) application of U.S. patent application Ser. No. 14/887,060, filed Oct. 19, 2015, (issued on Jun. 12, 2018 as U.S. Pat. No. 9,993,112), all of which are incorporated by reference herein.

BACKGROUND OF THE INVENTION

Disc Harrow

The disc harrow is a plowing and tilling tool used worldwide to open and break up the soil surface to help prepare the soil seedbed for planting. The disc harrow has applications in small and large commercial farms, homeowner landscaping, small nurseries, gardens, small hobby farms, wild game food plots, and medium-duty residential use. The disc harrow uses disc harrow blades. A typical disc harrow blade is concave, fabricated from carbon steel and has a diameter that can vary between approximately 12-36 inches.

The Skottle

Figure 2:
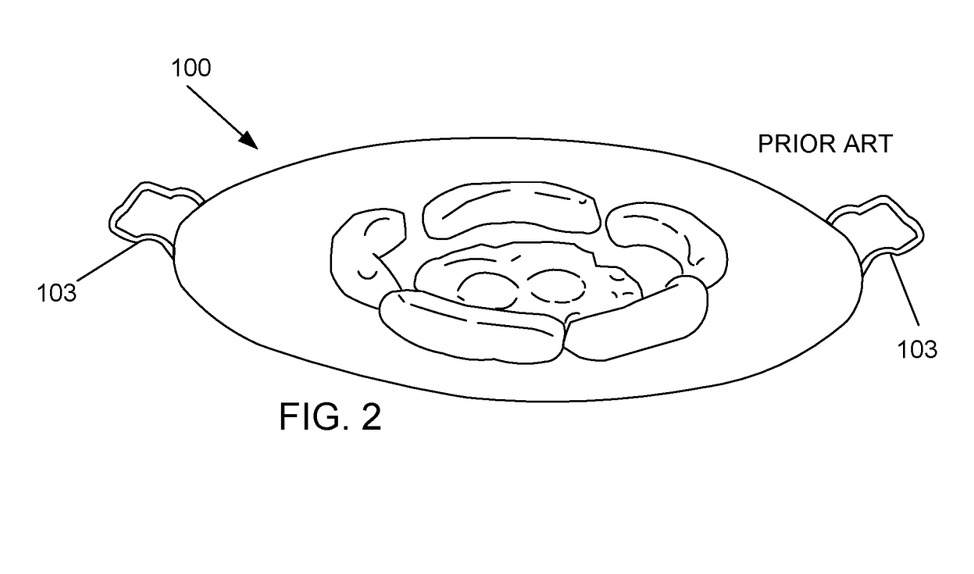
FIG. 2 shows a prior art skottle grill.

The skottle originated in South Africa where farmers found a secondary use for old harrow discs by turning them into an outdoor cooking utensil that could be used while out in the fields. FIG. 2 shows prior art skottle 100 having agricultural harrow disc blade 99 with attached handles 103. The skottle caught on with the public in the 1940s and 50s and is now synonymous with grilling in South Africa. In prior art, the user grabs the handles and lays the skottle over hot coals for the purpose of cooking. Anything that can be cooked in a pan, skillet or on a grill can be cooked in a skottle. Bacon, eggs, sausage and hash browns is a great example for breakfast.

Propane Burner Stove

Figure 1:
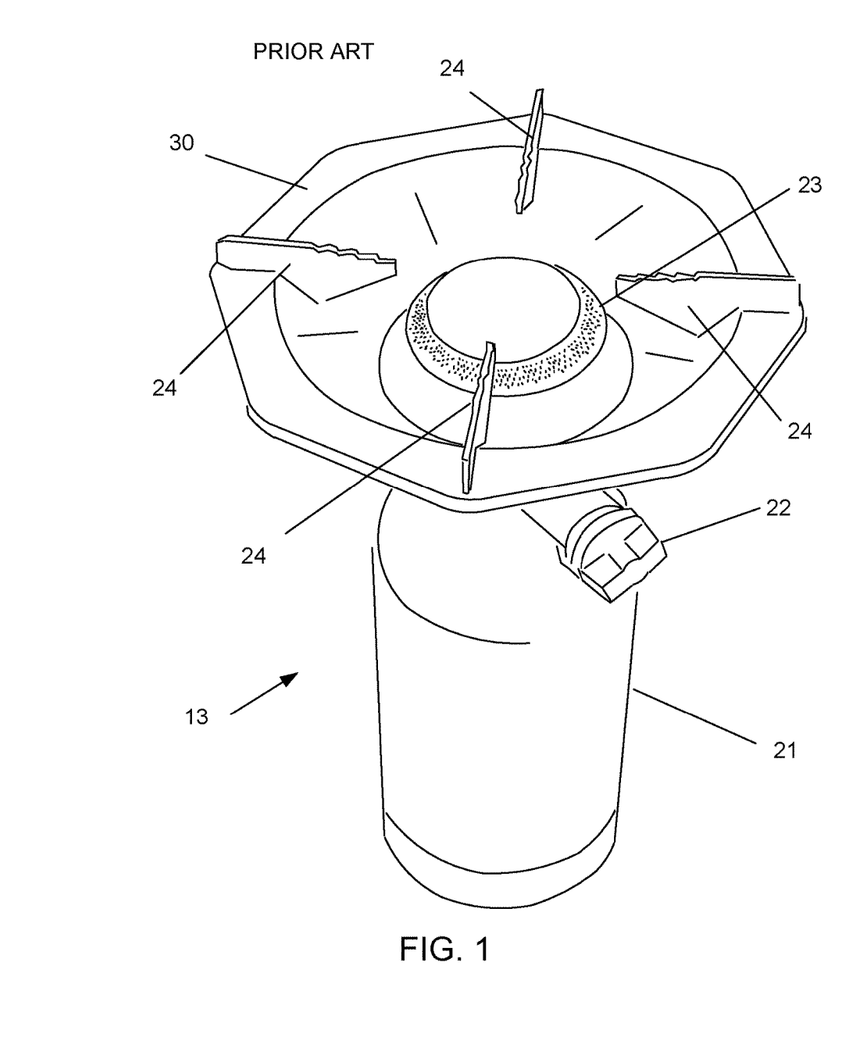
FIG. 1 shows a prior art portable propane stove with one burner.

FIG. 1 shows a prior art single burner propane stove 13 with attached propane fuel canister 21. An exemplary prior art single burner propane stove 13 is available from the Coleman Company, Inc., model no. 5431A700 one-burner propane stove. Propane stove 13 includes control valve 22 for controlling the amount of propane permitted to flow from canister 21 to burner 23. Four cookware support extensions 24 are attached to stove 13 as shown. For stove 13, the user typically first turns valve 24 to allow a flow of propane gas to flow through burner 23. The user then places a small pot or frying pan on top of cookware support extensions 24 over the flame from burner 23 for cooking. The user can control the heat by turning valve 22. This is an effective design. However, if the pot or frying pan is too large, stove 13 may become too top heavy and flip over.

Lightweight Portable Stove

Figure 6:
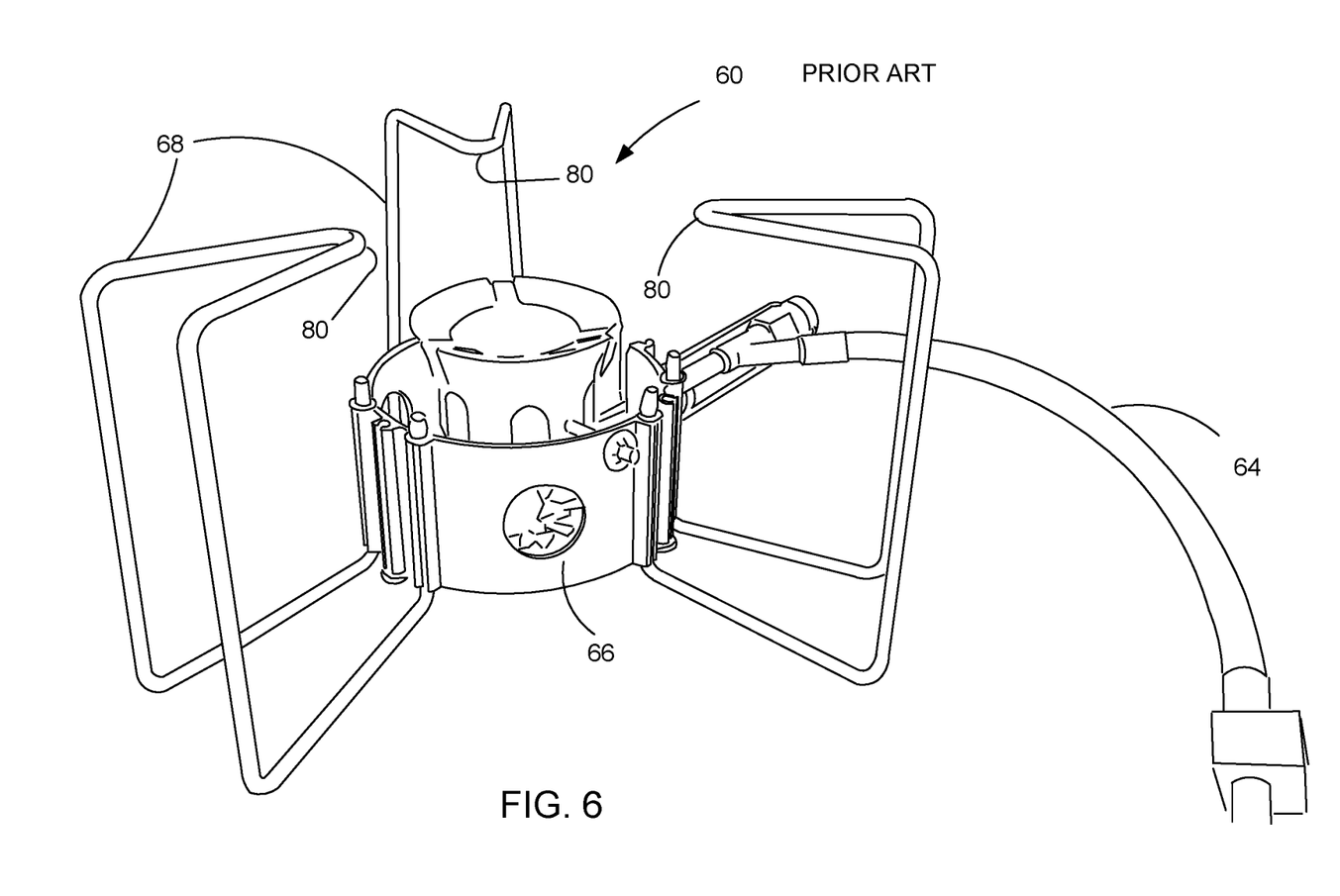
FIG. 6 shows another prior art stove.

FIG. 6 shows prior art multi-fuel stove 60. Stove 60 is the MSR DragonFly® Backpacking Stove available from Mountain Safety Research, Inc. with offices in Seattle, Wash. Stove 60 burns almost any fuel, including white gas, kerosene, diesel, automotive gas, aviation gas, stoddard solvent and naphtha. Multi-fuel stove 60 is popular because it can operate effectively with a variety of fuel types. It is also small and lightweight and is popular with backpackers. The weight of stove 60 is approximately only 14 ounces. A fuel canister (not shown) is connected to hose 64. Hose 64 is connected to burner 66. As with the above described stove, a user is able to place a small pot or frying pan on top of cookware support extensions 68 over the flame from burner 66 for cooking. The user can control the heat by a control valve. This is an effective design. However, if the pot or frying pan is too large, stove 60 may become too top heavy and flip over.

What is needed is a better cooking device that allows the use of a portable stove with a stable grill.

SUMMARY OF THE INVENTION

The present invention provides a cooking device. A connection mechanism is rigidly attached to the underside of a grill. A plurality of legs is attached to the grill for support. A stove having cookware support extensions is attached to the grill and supported by the connection mechanism. The connection mechanism positions the cookware support extensions tightly against the underside of the grill for optimum heat transfer. In a preferred embodiment, the cooking device is small, lightweight and easily portable.

DETAILED DESCRIPTION OF THE PREFERRED EMBODIMENTS

Figure 3:
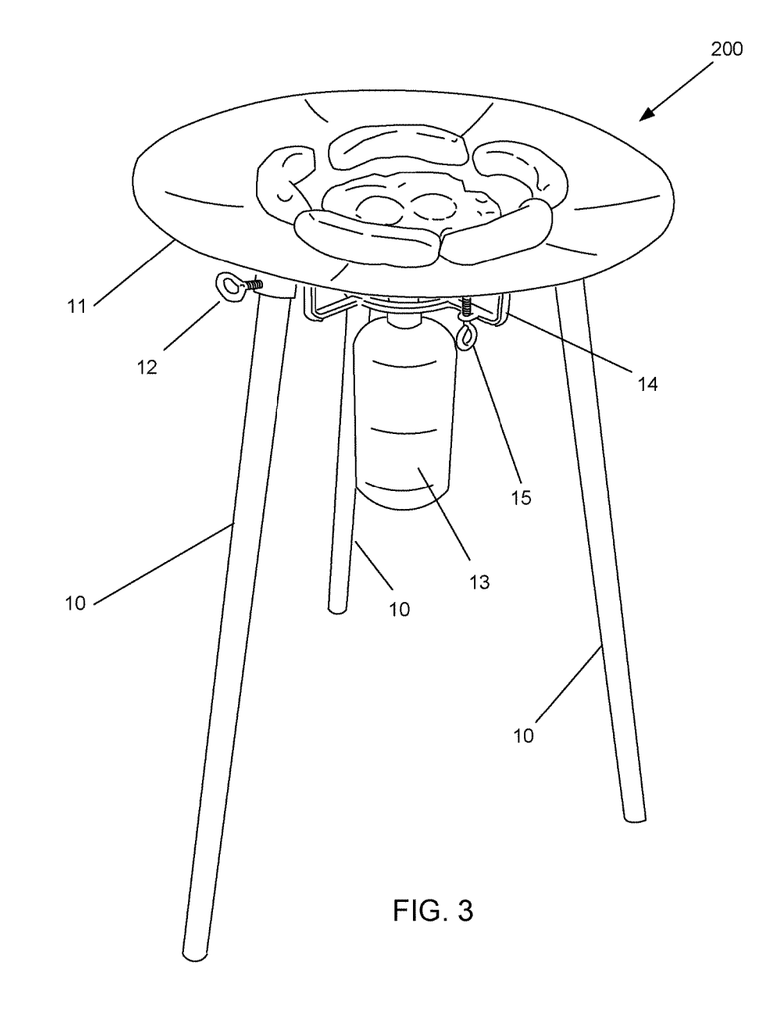
FIG. 3 shows a preferred embodiment of the present invention.

FIG. 3 shows a preferred embodiment of the skottle grill 200. Three legs 10 are removably attached to the underside of grill 11 and are secured tightly using hand-operated threaded attachment screws 12. Propane single burner stove 13 is supported by bracket 14 and is secured tightly against the underside of grill 11 by utilization of bracket 14 and threaded attachment stove screws 15. Food may then be placed into grill 11 as shown for cooking.

Skottle Grill

Figure 4:
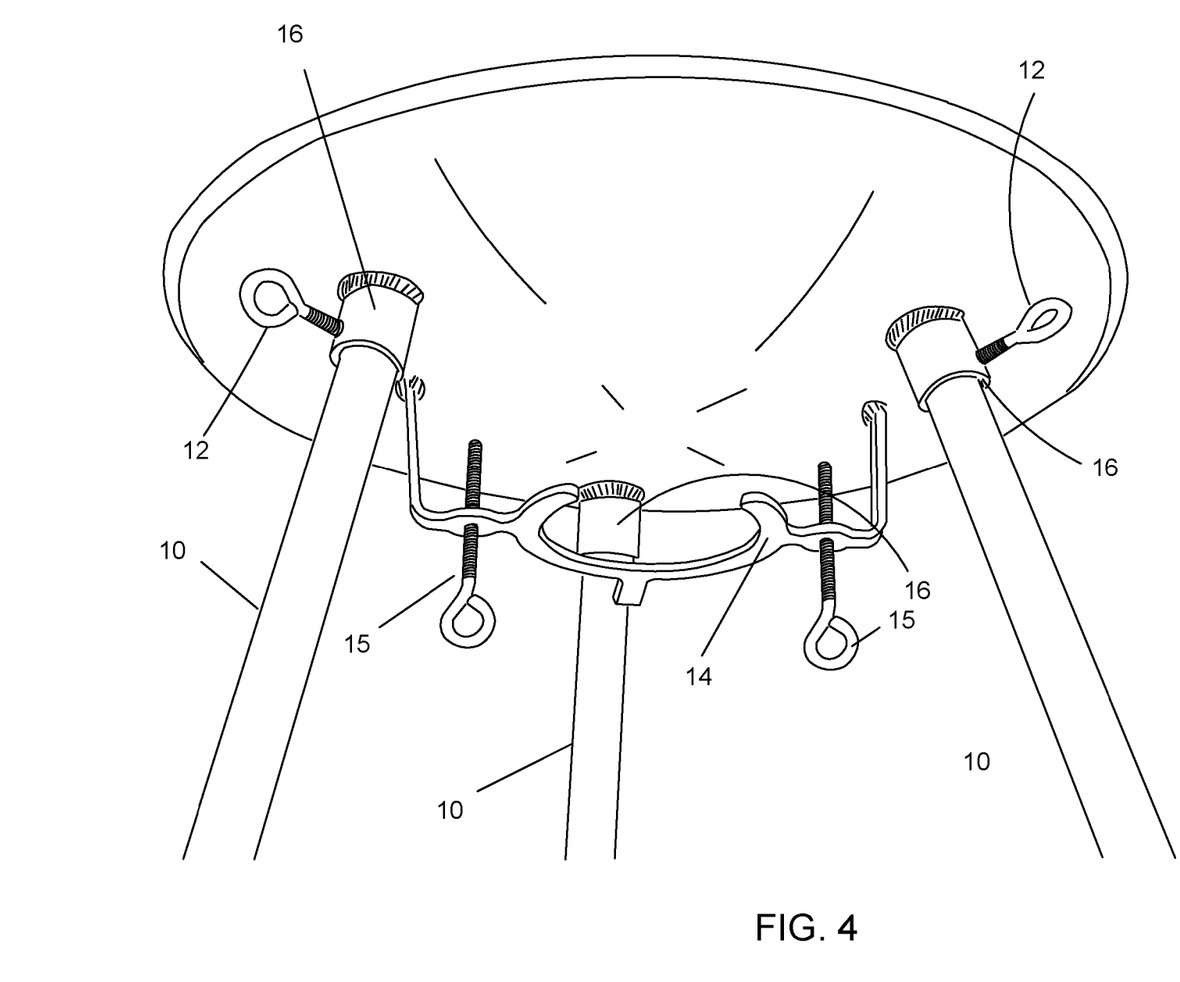
FIG. 4 shows the underside of a preferred skottle grill with welded support bracket.

FIG. 4 shows the underside of grill 11. Bracket 14 has been welded to the underside of grill 11. Leg support sleeves 16 have been welded to the underside of grill 11. Legs 10 are inserted into leg sleeves 16 and are secured in place with threaded attachment screws 12. Stove screws 15 are threaded through bracket 14 and may be loosened away from grill 11 or tightened towards grill 11.

Attaching the Burner to the Grill

Figure 5:
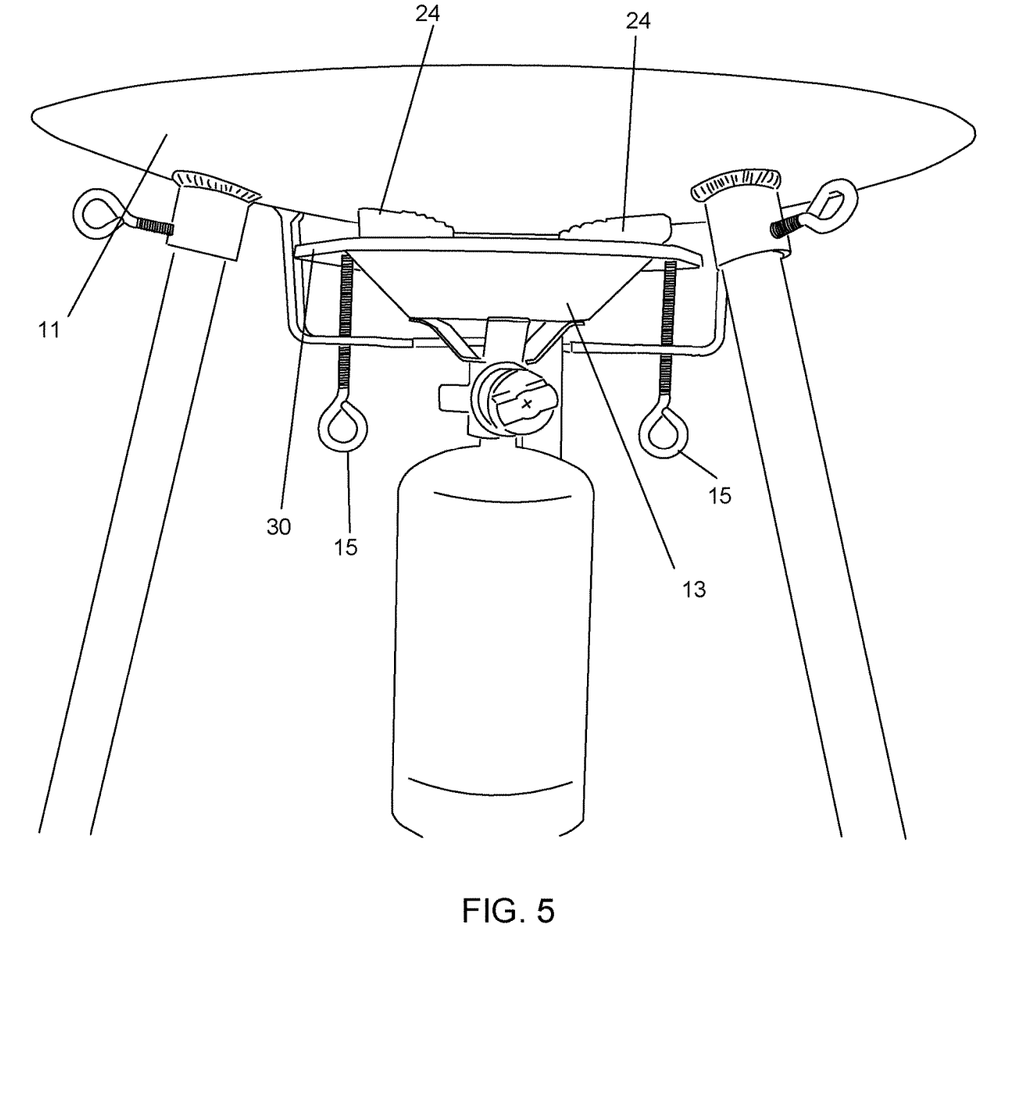
FIG. 5 shows a side view of a stove pressed tightly against the underside of a preferred skottle grill.

In FIG. 5 the user has inserted stove 13 into bracket 14 so that upper ridge 30 is inserted over screws 15 (see also FIG. 1). The user has then tightened screws 15 so that they move upwards towards grill 11. The closer burner 23 (FIG. 1) is to grill 11, the higher the temperature of the grill for cooking purposes. In FIG. 5 the user has tightened screws 15 upwards so that cookware support extensions 24 are pressed tightly against the underside of grill 11 for optimum heat transfer. The user is now ready to operate skottle grill 200 in a fashion depicted in FIG. 3. For example, in FIG. 3 stove 13 is pressed tightly against the underside of grill 11 for optimum heat transfer and the user is cooking sausages and eggs on skottle grill 200.

Lightweight Grill

FIGS. 7-10 show another preferred embodiment of the present invention. Grill 70 is small and lighter weight than grill 11 described above. In one preferred embodiment, grill 70 has a diameter of approximately 12 inches and weighs approximately 2 pounds. Grill 70 is preferably fabricated from stainless steel, although other lightweight materials can also be used (such as aluminum). Grill 70 is shaped similarly to grill 11 and has a similar concave top ideal for holding food for cooking. Three legs 71 are removably attached to the underside of grill 70 and are secured tightly using hand-operated threaded attachment screws 12.

Attachment Mechanism for Rigid Attachment of Burner to Grill

Figure 7:
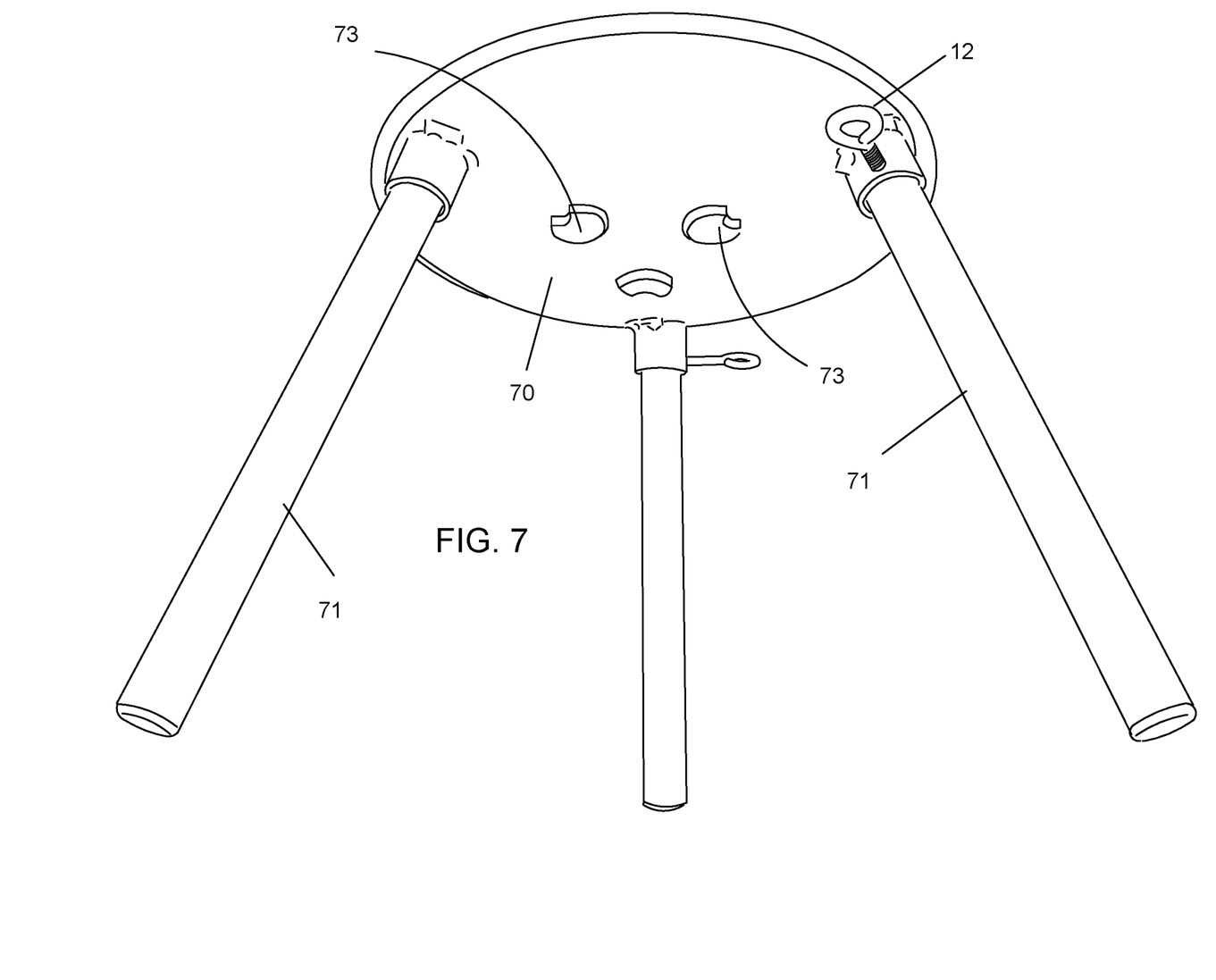
FIG. 7 shows a preferred embodiment of the present invention with attachment mechanisms.
Figure 8:
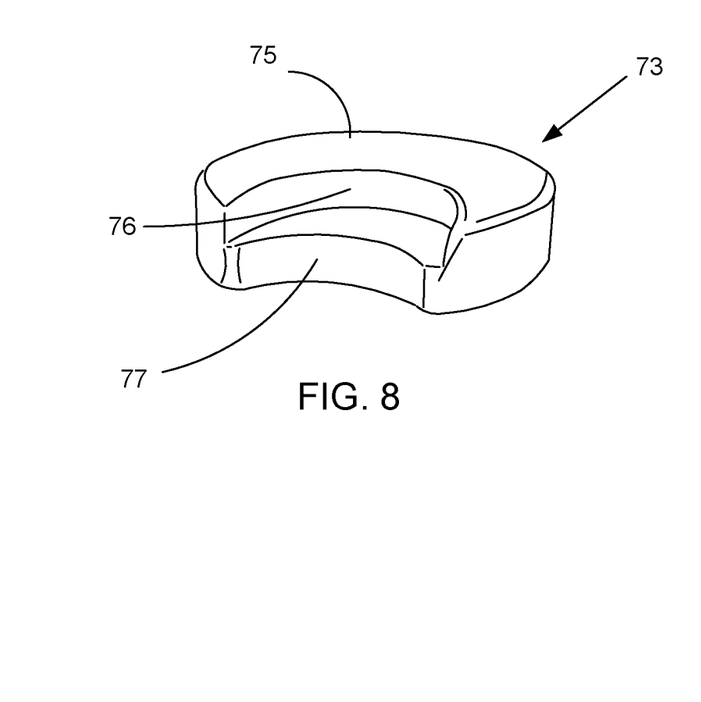
FIGS. 8-9 show detailed views of preferred attachment mechanisms.
Figure 9:
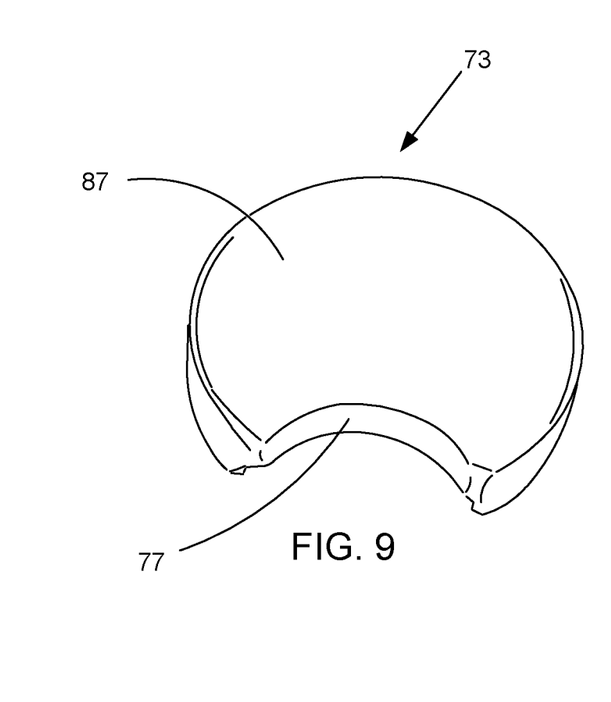

FIG. 7 shows attachment mechanisms 73 welded to the underside of grill 70. Detailed perspective views of an attachment mechanism 73 is shown are shown in FIGS. 8 and 9. FIG. 8 shows attachment side 75, deep cut section 76 and shallow cut section 77. FIG. 9 shows exposed side 87 and shallow cut section 77. Attachment side 75 is attached so that that it is adjacent to grill 70 as shown in FIG. 7. In a preferred embodiment, attachment mechanisms 73 are welded to the underside of grill 70. End sections 80 (FIG. 6) of cookware support extensions 68 are inserted into the space formed and bordered by the underside of grill 70, deep cut section 76 and shallow cut section 77 for rigid attachment of stove 60 to grill 70 (FIG. 10).

Figure 10:
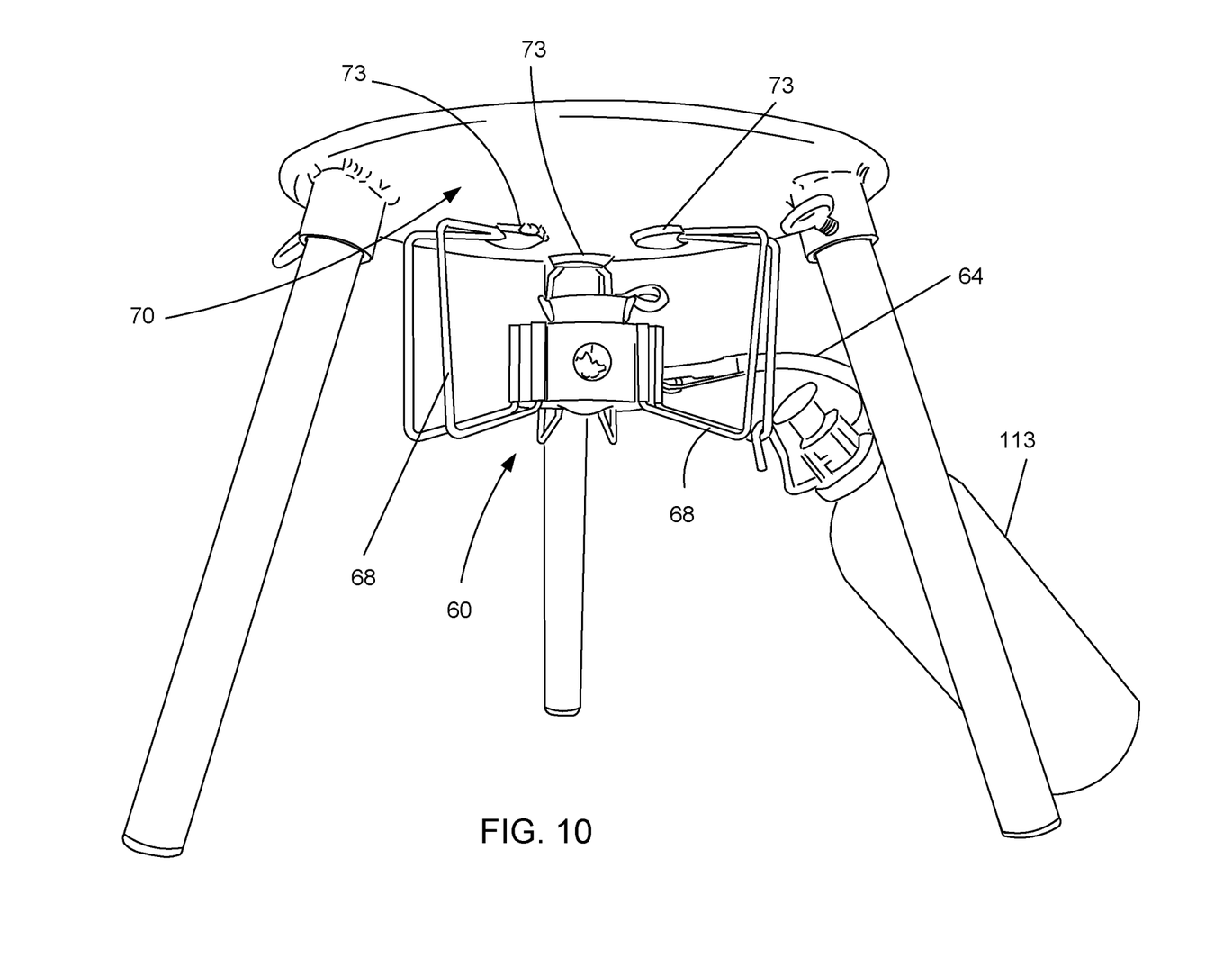
FIG. 10 shows a preferred embodiment of the present invention.

FIG. 10 shows a preferred embodiment of the present invention ready for usage with fuel canister 113 connected to hose 64. When the user wishes to remove stove 60 from the bottom of grill 70, the user pulls on cookware support extensions 68 until end sections 80 are clear of shallow cut section 77. The user can then easily disconnect stove 60.

Small, Lightweight, Easily Transportable

As shown in FIG. 10, grill 70 with attached stove 60 is small, lightweight and easily transportable. It is estimated that the combined weight of grill 70, legs 71 and stove 60 is approximately 2-4 pounds. For these reasons, this embodiment is very popular with backpackers, motorcycle riders, campers and others who wish to conserve on space and weight.

Also, it should be noted that the present invention can be modified to work with a variety of portable stoves utilizing a variety of attachment mechanisms. For example, other stove types may utilize cookware support extensions that vary in shape and appearance from cookware support extensions 68 of stove 60. Attachment mechanisms 73 can easily be modified to accommodate various styles of cookware support extensions. In all cases it would be preferable for the attachment mechanisms to hold the cookware support extensions tightly against the underside of grill 70 for maximum heat transfer.

While the present invention has been described in terms of preferred embodiments, the reader should consider these described embodiments only as particular embodiments. Many other embodiments are possible. For example, even though the above preferred embodiments discussed the utilization of skottle grill 11 for the present invention, it should be understood that bracket 14 could be welded to a variety of grill types other that a skottle grill. For example, bracket 14 could be welled to the bottom of a large frying pan or a Japanese wok. Therefore, the reader should determine the scope of the present invention by the claims and their legal equivalents.

What is claimed is:

1. A cooking device, comprising:
   A. a grill, comprising a grill underside,
   B. a stove comprising cookware support extensions,
   C. a plurality of legs attached to said grill, and
   D. a connection mechanism rigidly attached to said grill underside, wherein said connection mechanism positions said cookware support extensions against said underside of said grill.

2. The cooking device as in claim 1, wherein said connection mechanism is a stove support bracket rigidly attached to said grill underside, and further comprising a stove position adjustment mechanism connected to said stove support bracket, said stove position adjustment mechanism for moving said stove upwards so that said cookware support extensions are pressed tightly against the underside of said grill for optimum heat transfer.

3. The cooking device as in claim 2 wherein said grill is a skottle grill.

4. The cooking device as in claim 1 wherein said stove is a single burner propane stove.

5. The cooking device as in claim 1 wherein said plurality of legs is a plurality of detachable legs.

6. The cooking device as in claim 1 wherein said plurality of legs is three legs.

7. The cooking device as in claim 2 wherein said stove support bracket is welded to said grill underside.

8. The cooking device as in claim 2 wherein said stove position adjustment mechanism is two stove screws threaded through said stove support bracket.

9. The cooking device as in claim 1, wherein said connection mechanism is a plurality of connection mechanisms, each said connection mechanism comprising:
   A. a deep cut section for receiving said cookware support extension, and
   B. a shallow cut section for holding said cookware support extension in place when attached and for allowing removal of said cookware support extension when detaching said cookware support extension from said grill.

10. The cooking device as in claim 1, wherein said cooking device is small and lightweight and easily transportable.

* * * * *